Aug. 11, 1953
R. KENNEDY, JR
2,648,476
METHOD OF FILLING CONTAINERS
Filed June 4, 1947
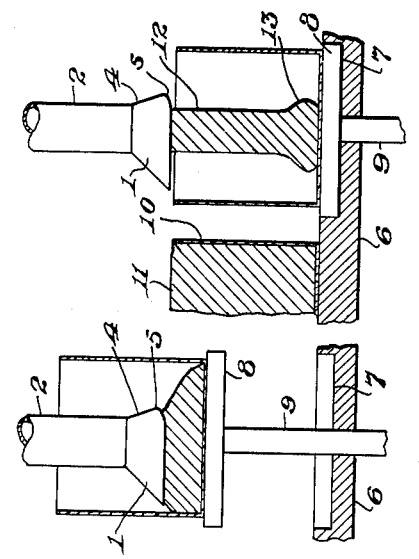
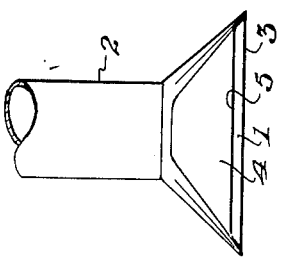
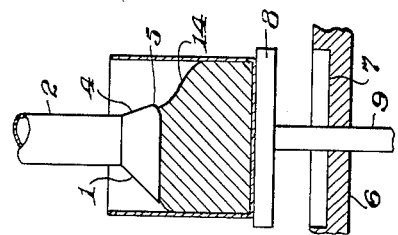
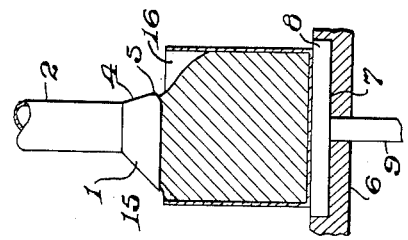
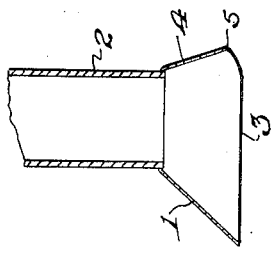
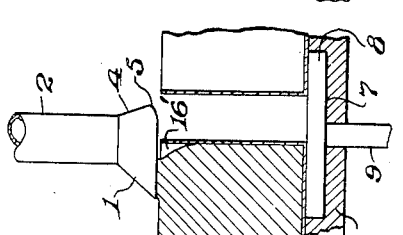
INVENTOR,
Ridgway Kennedy, Jr.
BY J. Stuart Freeman,
Attorney.

Patented Aug. 11, 1953

2,648,476

UNITED STATES PATENT OFFICE 2,648,476

METHOD OF FILLING CONTAINERS

Ridgway Kennedy, Jr., Drexel Hill, Pa., assignor to Abbotts Dairies, Inc., Philadelphia, Pa., a corporation of Maryland Application June 4, 1947, Serial No. 752,537

1 Claim. (Cl. 226—24)

The object of the invention is to fill ice cream, ices, and sherbets into cylindrical containers without air pockets or unfilled spaces being entrapped in it, and when the container is completely filled to level off the ice cream at the top, so the can cover can be placed thereon without the use of a scraper in order to do so.

In this art the container used is of cylindrical type and of approximately the same height as its diameter, and in a modern plant the containers proceed either continuously or with but slight hesitancy in a start-and-stop motion beneath the filling nozzle. The condition of the ice cream is that of a viscous, semi-liquid and therefore sluggish mass, and as the containers in a given line are of the same capacity when filled to level, the ice cream led thereinto must fill exactly for all practical purposes up to the level of the upper edges about their entire circumference, both in order to insure full measure and to eliminate any air pockets, which would give rise to complaints that the cans were not properly filled and a request for credit for the shortage.

With the objects thus briefly stated, the invention comprises further details of construction, which are hereinafter fully brought out in the following drawings, in which Fig. 1 is a side elevation of a nozzle comprising one embodiment of the invention; Fig. 2 is a plan view of the same; Fig. 3 is a section on the line 3—3 of Fig. 2; and Figs. 4 to 8, inclusive, are vertical diametrical sections through a representative container while being filled with a semi-liquid mass which may be ice cream or any other substance having comparable characteristics, and showing the nozzle and container in various relative positions, as the container-support passes through one cycle of operation.

Referring to the drawings, the improved nozzle per se comprises a conical frustum 1, the upper and smaller end of which is secured to the lower discharge end of a large pipe 2 through which the semi-liquid ice cream flows from the continuous ice cream freezers under pressure, while its lower end is considerably larger and terminates in a planular edge 3, one side of said nozzle being radially abbreviated by a transversely extending wall 4, which is either substantially flat or instead may be of curved shape, and which is in the position of a slanting geometrical chord of the conical portion of said nozzle, and is also preferably cut away slightly as at 5 to form an elevated lip for a purpose hereinafter described.

Referring to Figs. 4 to 8, inclusive, the practical use of the improved nozzle is shown in as many steps in the filling of an open-topped container with ice cream or the like. Here there is shown a platform 6 upon the upper surface of which containers are propelled in endless succession, preferably in brief period of start-and-stop motion. Resting upon, or sunk beneath the surface of said platform in a recess 7 when not in use, is an elevatable support 8, carried by the upper end of a suitably actuated, vertically reciprocatable shaft 9. Above and preferably slightly eccentrically with respect to the trailing side of the axis of said shaft is fixedly positioned the improved nozzle, with its flattened side wall 4 facing in the direction from which empty containers approach it.

Starting with Fig. 4, there is shown a container 10, which has been filled with ice cream 11 and passed on, as by means of any suitable form of conveyor or forwarding mechanism (not shown), thereby leaving the space above the platform 8 free to receive a second empty container 11 into which the continuously flowing column of ice cream 12 has entered and begun to spread in a radially enlarged "head" 13 upon contacting the bottom wall of said container. At this moment the support 8 is elevated, thereby flattening the "head" 13 and jamming it upwardly towards the nozzle 1, as shown in Fig. 5, the ice cream being forced radially outwardly into engagement with the bottom and lowermost portions of the side walls of said container, to positively eliminate any air pockets or short-weight voids in these regions.

From this point said platform begins to descend at a speed that has been nicely timed to substantially coincide with the emergence of ice cream from the nozzle, with the result, as shown in Fig. 6, that the ice cream 14 continues to steadily build up in the container as said platform descends. Thus, upon said platform again reaching the lowermost position in its cycle of operation (Fig. 7), the container has become practically filled, especially adjacent to its leading side at 15, and with but a small and constantly diminishing air space 16 at its trailing side. The container is at this instant propelled forwardly, that is, towards the left as viewed in the drawings, and as this movement takes place it will be seen that the diminishing air space 16' in Fig. 8 is gradually filled, while the planular edge 3 of the nozzle wipes the ice cream level with the surface of the trailing edge of the container, as indicated by the last-filled container 17 in Fig. 8, the cut away edge portion 5 clearing the trailing edge portion of the containers in succession and any slight irregularities that may be thereon or carried thereby.

Having thus described my invention, what I claim and desire to protect by Letters Patent of the United States is:

The method of filling an empty container with a semi-liquid substance by means of a nozzle having a wiping edge that lies in a plane closely parallel with the upper edge of the container when the latter is full and with the axis of said nozzle closer to the forward wall of the container than to the rearward wall, which consists in flowing a column of the substance into and more closely adjacent to the forward wall of the container while said nozzle is stationary and until the column of such substance contacts the bottom wall of the container, lifting the container towards the nozzle after said contact to thereby flatten out more against said forward wall that portion of the substance that has contacted the container bottom, lowering the container as it fills with the substance more rapidly against said forward wall to drive air in the container towards the said rearward wall during constant discharge from said nozzle, and upon the container reaching the lowermost position in its cycle of movement moving it forwardly with respect to and from beneath said nozzle, so that the trailing edge of said nozzle finally flows the substance into and fills the upper rearward portion of the container, as it forces air from, and wipes the contents cleanly with respect to, the upper edges of the container.

RIDGWAY KENNEDY, Jr.

References Cited in the file of this patent

UNITED STATES PATENTS

| Number | Name | Date |
|---|---|---|
| 171,164 | Perkins | Dec. 14, 1875 |
| 877,322 | Gebler | Jan. 21, 1908 |
| 1,881,106 | Vogt et al. | Oct. 4, 1932 |
| 2,136,224 | Weinreich | Nov. 8, 1938 |
| 2,145,240 | Adams | Jan. 31, 1939 |
| 2,387,452 | Lundal | Oct. 23, 1945 |
| 2,394,737 | Allen | Feb. 12, 1946 |